United States Patent
Archambault et al.

(10) Patent No.: US 7,168,070 B2
(45) Date of Patent: Jan. 23, 2007

(54) AGGREGATE BANDWIDTH THROUGH MANAGEMENT USING INSERTION OF RESET INSTRUCTIONS FOR CACHE-TO-CACHE DATA TRANSFER

(75) Inventors: Roch Georges Archambault, North York (CA); Robert James Blainey, Newmarket (CA); Yaoqing Gao, North York (CA); Randall Ray Heisch, Georgetown, TX (US); Steven Wayne White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 10/853,304

(22) Filed: May 25, 2004

(65) Prior Publication Data

US 2005/0268039 A1 Dec. 1, 2005

(51) Int. Cl.
*G06F 9/45* (2006.01)
*G06F 13/00* (2006.01)

(52) U.S. Cl. ............ 717/151; 717/154; 711/137; 711/119; 712/227

(58) Field of Classification Search ............ 717/160, 717/159, 151, 154, 158; 711/137, 119, 213; 712/205, 227, 237
See application file for complete search history.

(56) References Cited

U.S. PATENT DOCUMENTS

| | | | |
|---|---|---|---|
| 4,991,088 A | 2/1991 | Kam ...................... 364/200 |
| 5,551,001 A | 8/1996 | Cohen et al. ............ 395/449 |
| 5,692,152 A | 11/1997 | Cohen et al. ............ 395/467 |
| 5,704,053 A | 12/1997 | Santhanam ............. 284/383 |
| 5,797,013 A | 8/1998 | Mahadevan et al. ..... 395/709 |
| 5,854,934 A | 12/1998 | Hsu et al. ............... 395/709 |
| 5,953,531 A | 9/1999 | Megiddo et al. ......... 395/709 |
| 6,148,439 A | 11/2000 | Nishiyama ................ 717/9 |
| 6,249,845 B1 * | 6/2001 | Nunez et al. ............. 711/129 |
| 6,301,641 B1 * | 10/2001 | Verhoeven et al. ...... 711/118 |
| 6,374,330 B1 | 4/2002 | Arimilli et al. ........... 711/141 |
| 6,421,826 B1 | 7/2002 | Kosche et al. ........... 717/161 |
| 6,539,541 B1 | 3/2003 | Geva ........................ 717/150 |
| 6,567,976 B1 | 5/2003 | Wolf ........................ 717/160 |

(Continued)

OTHER PUBLICATIONS

Barua, R. "Communication-Minimal Partitioning of Parallel Loops and Data Arrays for Cache-Coherent Distributed-Memory Multi-processors", Proceedings Languages and Compilers for Parallel Computing, 9th International Workshop, LCPC '96, p. 350-368 Aug. 1996.

(Continued)

*Primary Examiner*—Hong Kim
(74) *Attorney, Agent, or Firm*—David R. Irvin

(57) ABSTRACT

A method and system for reducing or avoiding store misses with a data cache block zero (DCBZ) instruction in cooperation with the underlying hardware load stream prefetching support for helping to increase effective aggregate bandwith. The method identifies and classifies unique streams in a loop based on dependency and reuse analysis, and performs loop transformations, such as node splitting, loop distribution or stream unrolling to get the proper number of streams. Static prediction and run-time profile information are used to guide loop and stream selection. Compile-time loop cost analysis and run-time check code and versioning are used to determine the number of cache lines ahead of each reference for data cache line zeroing and to tolerate required data alignment relative to data cache lines.

25 Claims, 15 Drawing Sheets

U.S. PATENT DOCUMENTS

| | | | |
|---|---|---|---|
| 6,571,318 B1* | 5/2003 | Sander et al. | 711/137 |
| 2002/0007484 A1 | 1/2002 | Tirumalai et al. | 717/9 |
| 2002/0010913 A1 | 1/2002 | Ronstrom | 717/9 |
| 2003/0005419 A1 | 1/2003 | Pieper et al. | 717/141 |
| 2003/0088864 A1 | 5/2003 | Tirumalai et al. | 717/160 |
| 2004/0123081 A1* | 6/2004 | Knies et al. | 712/225 |
| 2004/0154019 A1* | 8/2004 | Aamodt et al. | 718/102 |

OTHER PUBLICATIONS

Aschenbrenner, J. M. "Zeroing Memory Using Data Cache Line", IBM TDB, v 40 n 2, p. 221-222, Feb. 1997.

* cited by examiner

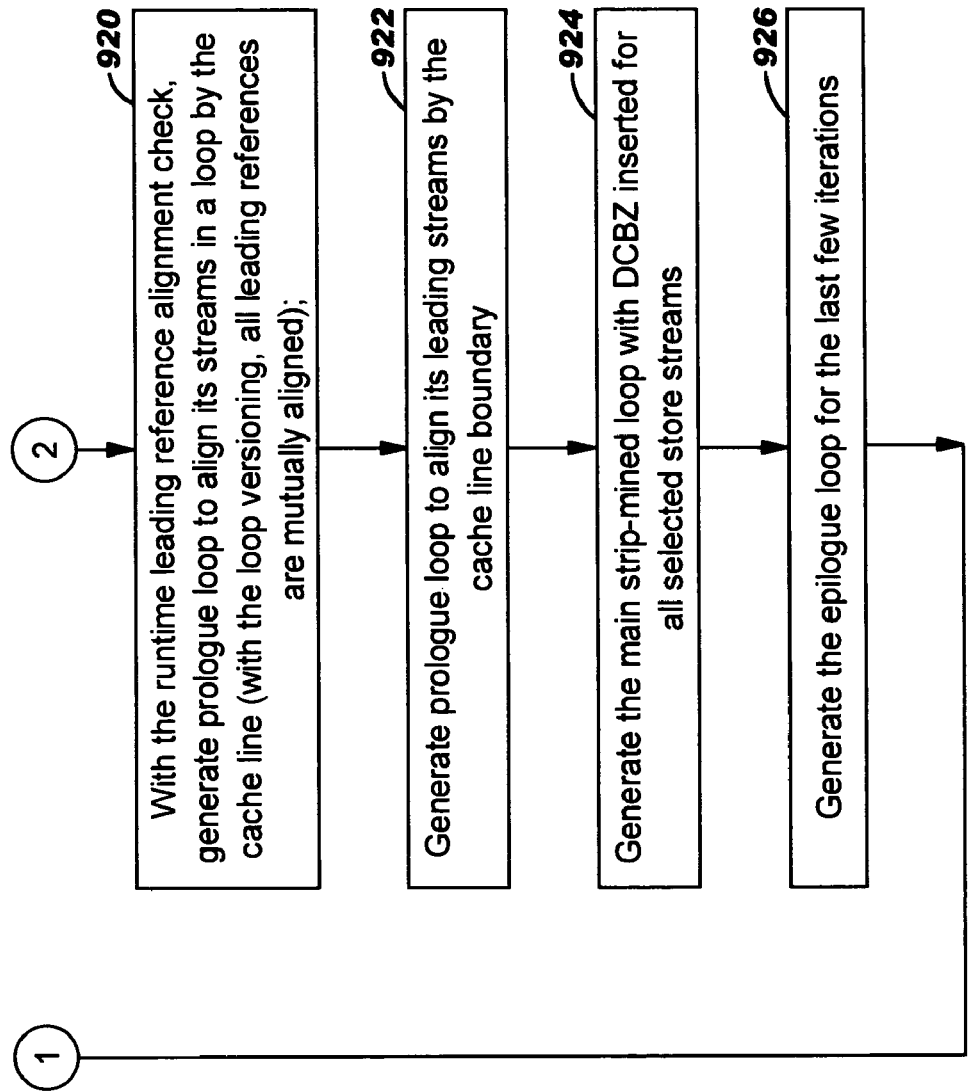

FIG. 11

Original (804):
```
DO K = 2, NSIZE3-1
DO J = 2, NSIZE2-1
DO I = 2, NSIZE1-1
    A3(i,j,k) = B1(I,J,K)
 &      +s1*B2(i+1,j,k)     +s2*B3(i-1,j,k)
 &      +s3*B4(i,j+1,k)     +s4*B5(i,j-1,k)
 &      +s5*B6(i,j,k+1)     +s6*B7(i,j,k-1)
 &      +s7*B8(i+1,j+1,k)   +s8*B9(i-1,j+1,k)
 &      +s9*B10(i+1,j-1,k)  +s10*B11(i-1,j-1,k)
 &      +s11*B12(i+1,j,k+1) +s12*B13(i+1,j,k-1)
 &      +s13*B14i(i-1,j,k+1)+s14*B15(i-1,j,k-1)
END DO
END DO
END DO
```

Transformed (805, 806):
```
DO K = 2, NSIZE3-1
DO J = 2, NSIZE2-1

DO I = 2, NSIZE1-1
    A3(i,j,k) = B1(I,J,K)
 &      +s1*B2(i+1,j,k)     +s2*B3(i-1,j,k)
 &      +s3*B4(i,j+1,k)     +s4*B5(i,j-1,k)
 &      +s5*B6(i,j,k+1)     +s6*B7(i,j,k-1)
 &      +s7*B8(i+1,j+1,k)
END DO

DO I = 2, NSIZE1-1
    A3(i,j,k) = A3(I,J,K)
 &      +s9*B10(i+1,j-1,k)  + s8*B9(i-1,j+1,k)
 &      +s11*B12(i+1,j,k+1) +s10*B11(i-1,j-1,k)
 &      +s13*B14i(i-1,j,k+1)+s12*B13(i+1,j,k-1)
 &                          +s14*B15(i-1,j,k-1)
END DO

END DO
END DO
```

AGGREGATE BANDWIDTH THROUGH MANAGEMENT USING INSERTION OF RESET INSTRUCTIONS FOR CACHE-TO-CACHE DATA TRANSFER

FIELD OF THE INVENTION

The present invention relates to cache-to-cache data transfer.

BACKGROUND

A user's view of a shared-memory system is elegantly simple, all processors read and modify data in a single shared store. This makes shared-memory multiprocessors preferable to message-passing multicomputers from the user's point of view. Most shared-memory multiprocessors accelerate memory accesses using per-processor caches. Caches are usually transparent to software through a cache coherence protocol. There are many different approaches to cache architectures, such as directory-based coherence protocols (cc-NUMA multiprocessors) that allow a large number of processors to share a single global address space over physically distributed memory, and snooping-based ones (SMP designs). The main difficulty in such designs is to implement the cache coherence protocol in such an efficient way that minimizes the usually long L2 miss latencies.

Snooping and directory protocols are the two dominant classes of cache coherence protocols for hardware shared-memory multiprocessors. Snooping systems (such as the Sun UE1000) use a totally ordered network to directly broadcast coherence transactions to all processors and memory. This way, lower latencies than directory protocols can be achieved for cache-to-cache transfer misses (for all sharing misses in general). Directory protocols transmit coherence transactions over an arbitrary point-to-point network to the corresponding home directories which, in turn, redirect them to the processors caching the line. The consequences are that directory systems (such as the SGI Origin 2000) can scale to large configurations, but they can have high unloaded latency because of the overheads of directory indirection and message sequencing.

Effective cache management is a critical factor in obtaining optimal application performance with the growing disparity in clock speeds between the processor and memory, combined with an increasing degree of processor instruction level parallelism. To cope with the memory latency penalty, there are two typical approaches: one is to reduce latency and the other is to tolerate latency. Techniques for reducing latency include maintaining locality of data references through locality optimizations. Techniques for tolerating latency include buffering and pipelining references, and prefetching under software control through the use of processor-specific features.

Prefetching by loading the next cache line in sequence can be implemented in hardware, software, or a combination of both. The software prefetch approach uses compile-time information to insert memory "touch" instructions, whereas the hardware approach detects memory reference patterns at run-time and automatically triggers memory touches. There is much published literature on prefetching to cope with the following issues: (1) reducing the overhead caused by explicit prefetch instructions; and, (2) placing prefetch instructions such that data is available when a demand load is issued.

The published literature on prefetching includes the following: Todd C. Mowry, Monica S. Lam and Anoop Gupta, "Design and Evaluation of a Compiler Algorithm for Prefetching," 1992 Association for Computing Machinery; P. Cao, E. W. Felton, A. R. Karlin, and K. Li, "A Study of Integrated Prefetching and Caching Strategies", Proceedings of ACM SIGMETRICS'95, pp. 188–197, May 1995; Callahan, D., Kennedy, K., and Porterfield, A., "Software Prefetching," in Proceedings of the 4th International Conference on Architectural Support for Programming Languages and Operating Systems (April), ACM, New York, 40–52; Klaiber, A. C. and Levey, H. M. "Architecture for Software-Controlled Data Prefetching," in Proceedings of the 18th Annual International Symposium on Computer Architecture (May 1991), 43–63; and, Santhanam Vatsa, "Efficient Explicit Data Prefetching Analysis and Code Generation in a Low-level Optimizer for Inserting Prefetch Instructions into Loops of Applications," U.S. Pat. No. 5,704,053.

Todd C. Mowry, Monica S. Lam, and Annop Gupta propose a software prefetch algorithm with the notion of identifying a prefetch predicate and the leading reference among multiple references to an array for selective prefetch with interaction of other transformations such as cache blocking and software pipelining. It is assumed that the arrays of interest are aligned on cache line boundaries. Santhanam Vatsa uses simple subscript expression analysis and explicit data cache prefetch instruction insertion with the integration of other low level optimization phases such as loop unrolling, register reassociation and instruction scheduling.

Well-known dependence and reuse analyses are detailed in the following references: Michael E. Wolf and Monica S. Lam, "A Data Locality Optimizing Algorithm," SIGPLAN Notices 26, 6 (June 1991), 30–44, Proceedings of the ACM SIGPLAN'91 Conference on Programming Language Design and Implementation; Dror E. Maydam, John L. Hennessy and Monica S. Lam, "Efficient and Exact Data Dependence Analysis," Proceedings of the ACM SIGPLAN'91 Conference on Programming Language Design and Implementation, Toronto, Ontario, Canada, Jun. 26-28, 1991; Gina Goff, Ken Kennedt, Chau-Wen Tseng, "Practical Dependence Testing," Proceedings of the ACM SIGPLAN'91 Conference on Programming Language Design and Implementation, Toronto, Ontario, Canada, Jun. 26–28, 1991; and, M. Wolfe, Chau-Wen Tseng, "The Power Test for Data Dependence," Technical Report, Oregon Graduate Institute of Science and Technology.

SUMMARY

The present invention provides a method and system for reducing or avoiding store misses with a data cache block zero (DCBZ) instruction in cooperation with the underlying hardware load stream prefetching support for helping to increase effective aggregate bandwidth. The method first identifies and classifies unique streams in a loop based on dependency and reuse analysis, and then performs loop transformations, such as node splitting, loop distribution or stream unrolling to get the proper number of streams. Static prediction and run-time profile information are used to guide loop and stream selection. Due to the functioning and performance characteristics of the DCBZ instruction, compile-time loop cost analysis and run-time check code and versioning are used to determine the number of cache lines ahead of each reference for data cache line zeroing and to tolerate required data alignment relative to data cache lines. With the integration of other loop optimizations for data locality, a remarkable performance improvement can be obtained though this method based on the measurement on SPEC2000 and stream benchmarks.

In particular, the present invention for SMP environments can make use of Power 4 chip architectural features to avoid or otherwise inhibit store misses for certain store stream patterns and to increase the parallelism of store instruction processing. The store miss control method first identifies and classifies unique streams in a loop, based on well-known dependence and reuse analyses and then performs loop transformations, particularly, loop distribution or stream unrolling to get the proper number of streams.

According to the present invention there is provided a method for cache management in a shared memory multiprocessor environment to inhibit the occurrence of store misses during transfer of a store stream from a first cache to a second cache, the store stream including a plurality of cache lines having updated store elements, the method comprising the steps of: identifying the store stream for potential miss conditioning in a loop of an application code; performing a cost analysis for calculating a threshold value for further consideration of the identified store stream for miss conditioning; selecting the identified store stream for miss conditioning based on an accepted value for the threshold value; and conditioning the selected store stream for miss inhibition by inserting a reset instruction in a corresponding loop of the selected store stream, the reset instruction for clearing at least one cache line in the second cache in advance of a store operation of the selected store stream; wherein the reset instruction causes the environment to override an imposed store condition of a prefetch operation such that a previous version of the updated store elements is resident in the second cache in order to complete the store operation.

According to a further aspect of the present invention there is provided a system for cache management in a shared memory multiprocessor environment to inhibit the occurrence of store misses during transfer of a store stream from a first cache to a second cache, the store stream including a plurality of cache lines having updated store elements, the system comprising: an identification module for identifying the store stream for potential miss conditioning in a loop of an application code; a threshold module for performing a cost analysis for calculating a threshold value for further consideration of the identified store stream for miss conditioning; a selection module for selecting the store stream for miss conditioning based on an accepted value for the threshold value; and a insertion module for conditioning the selected store stream for miss inhibition by inserting a reset instruction in a corresponding loop of the selected store stream, the reset instruction for clearing at least one cache line in the second cache in advance of a store operation of the selected store stream; wherein the reset instruction causes the environment to override an imposed store condition of a prefetch operation such that a previous version of the updated store elements is resident in the second cache in order to complete the store operation.

According to a still further aspect of the present invention there is provided a computer program product for cache management in a shared memory multiprocessor environment to inhibit the occurrence of store misses during transfer of a store stream from a first cache to a second cache, the store stream including a plurality of cache lines having updated store elements, the computer program product comprising: a computer readable medium; an identification module stored on the medium for identifying the store stream for potential miss conditioning in a loop of an application code; a threshold module stored on the medium for performing a cost analysis for calculating a threshold value for further consideration of the identified store stream for miss conditioning; a selection module coupled to the threshold module for selecting the store stream for miss conditioning based on an accepted value for the threshold value; and an insertion module coupled to the selection module for conditioning the selected store stream for miss inhibition by inserting a reset instruction in a corresponding loop of the selected store stream, the reset instruction for clearing at least one cache line in the second cache in advance of a store operation of the selected store stream; wherein the reset instruction causes the environment to override an imposed store condition of a prefetch operation such that a previous version of the updated store elements is resident in the second cache in order to complete the store operation.

BRIEF DESCRIPTION OF THE DRAWINGS

A better understanding of these and other embodiments of the present invention can be obtained with reference to the following exemplary drawings and detailed description of the preferred embodiments, in which:

FIG. 9b shows further steps of the store miss management method of FIG. 9a;

FIG. 11 is an exemplary application of the method of FIGS. 9a and 9b;

Similar references are used in different figures to denote similar components.

DETAILED DESCRIPTION

The following detailed description of embodiments of the present invention does not limit the implementation of the invention to any specific computer programming language or multiprocessor hardware environment. The present invention may be implemented in any computer programming language provided that the OS (Operating System) provides the facilities that may support the requirements of the present invention. A preferred embodiment is implemented in the C/C++/Fortran computer programming language (or other computer programming languages in conjunction with C/C++/Fortran). Any limitations presented would be a result of a particular type of operating system, computer programming language, or data processing system, and would not be a limitation of the present invention.

Shared Memory System

Figure 1:
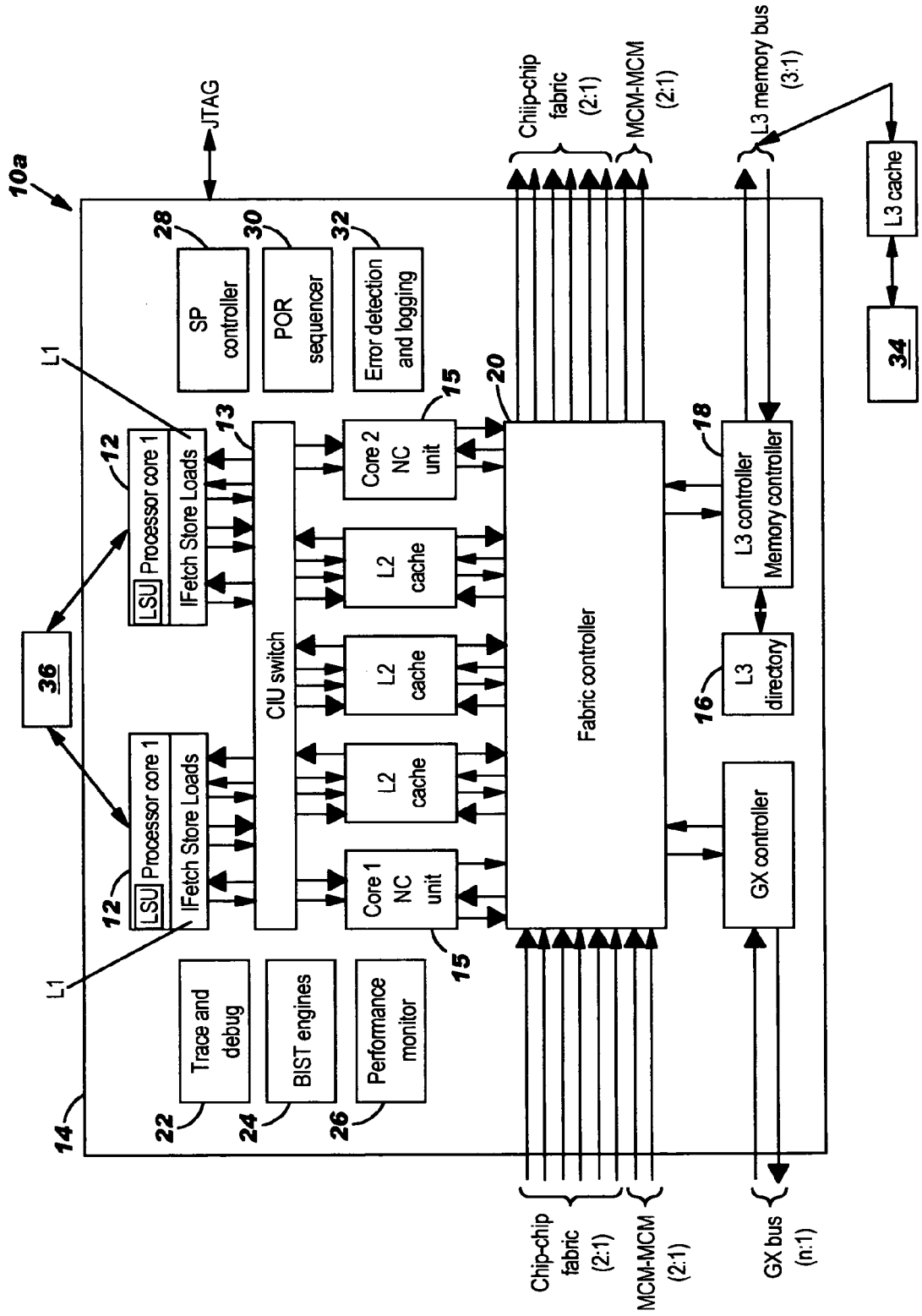
FIG. 1 shows a shared memory multiprocessor environment.

The components of a shared memory multiprocessor system 10a having at least two coupled caches are shown in FIG. 1. It is recognized that the system 10a is not constrained to any network topology and, in general, the below-described control of cache-to-cache transfer misses for store operations it is equally applicable to reduce the latency of cache-to-cache transfer store misses for a variety of environments, such as but not limited to SMP (Shared Memory Processing), MMP (Massively Parallel Processing), DSM (Distributed Shared Memory), and Directory-based coherence protocols (cc-NUMA multiprocessors). For illustrative purposes only, the following discussion of the system 10a will be applied to the SMP architecture of the POWER4 chip of the IBM Corporation, Armonk, N.Y.

The POWER4 design features two processors 12 on one chip 14; included in what we are referring to as the processor 12 are the various execution units and the split first-level instruction and data L1 caches. The two processors 12 share a unified second-level L2 cache, also on the same chip 14, through a core interface unit (CIU) 13. The CIU 13 is a crossbar switch between the L2, implemented as three separate, autonomous cache controllers, and the two processors 12. Each L2 cache controller can operate concurrently and feed 32 bytes of data per cycle. The CIU 13 connects each of the three L2 controllers to either the data cache or the instruction cache (collectively referred to as the L1 cache) in either of the two processors 12. Additionally, the CIU 13 accepts stores from the processors 12 across 8-byte-wide buses and sequences them to the L2 controllers. Each processor 12 has associated with it a noncacheable unit NC 15 responsible for handling instruction-serializing functions and performing any noncacheable operations in the storage hierarchy. Logically, this is part of the L2 cache for the POWER4 chip 14.

Figure 5:
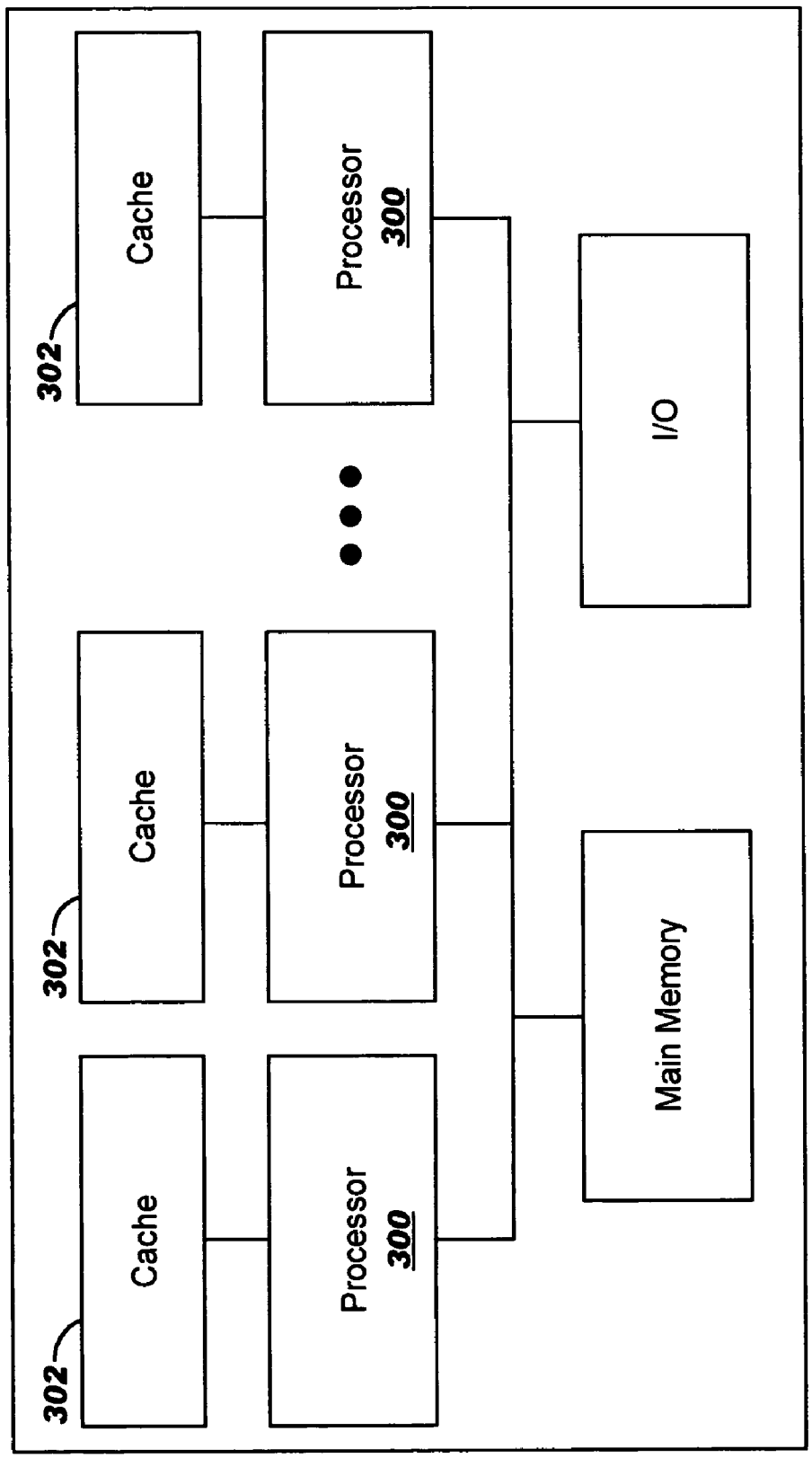
FIG. 5 is an alternative environment of FIG. 1.

A directory 16 for a third-level cache, L3, and its controller 18 are also located on the POWER4 chip 14. The actual L3 cache can be on a separate chip (not shown). A separate functional unit, referred to as the fabric controller 20, is responsible for controlling dataflow between the L2 and L3 controller for the chip 14 and for POWER4 communication. The L3 memory cache is connected to a system memory 34, such as but not limited to RAM chips, magnetic tape, floppy disk, and CD/DVD ROM. A GX controller is responsible for controlling the flow of information into and out of the system 10. Typically, this could be the interface to an I/O drawer attached to the system 10a. With the POWER4 architecture, however, the GX controller is also the point at which we could directly attach an interface to a switch for clustering multiple POWER4 nodes (see FIG. 5). Shown in FIG. 5 is an example SMP multiprocessor environment 10b having a plurality of processors 300 (for example representing multiple POWER4 chips 14) and associated caches 302 coupled to a main memory 302. The caches 302 of the system 10b could each represent multiple coupled caches, such as the L1,L2, L3 cache arrangement of FIG. 1.

Figure 6:
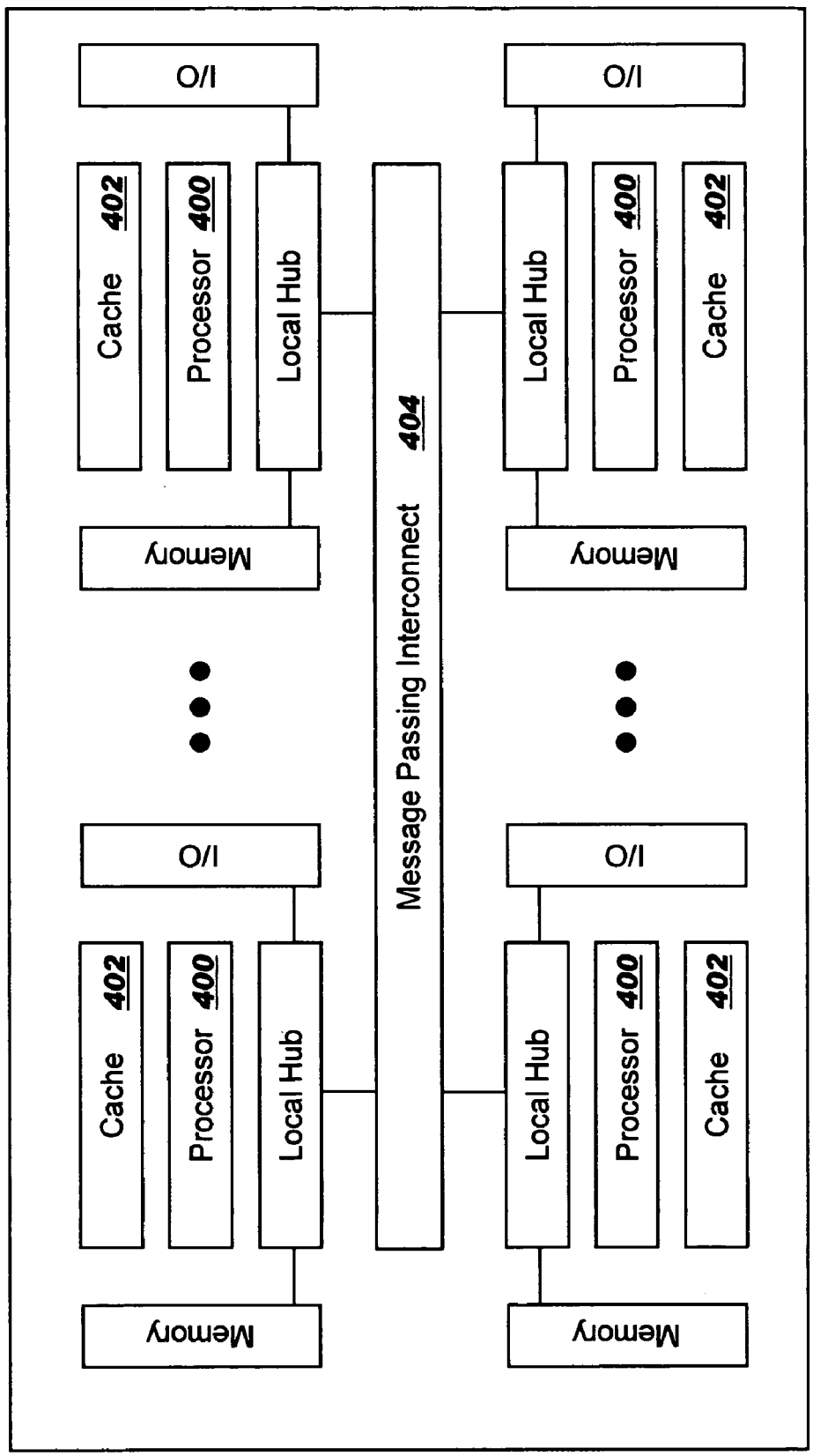
FIG. 6 is an alternative environment of FIG. 1.
Figure 7:
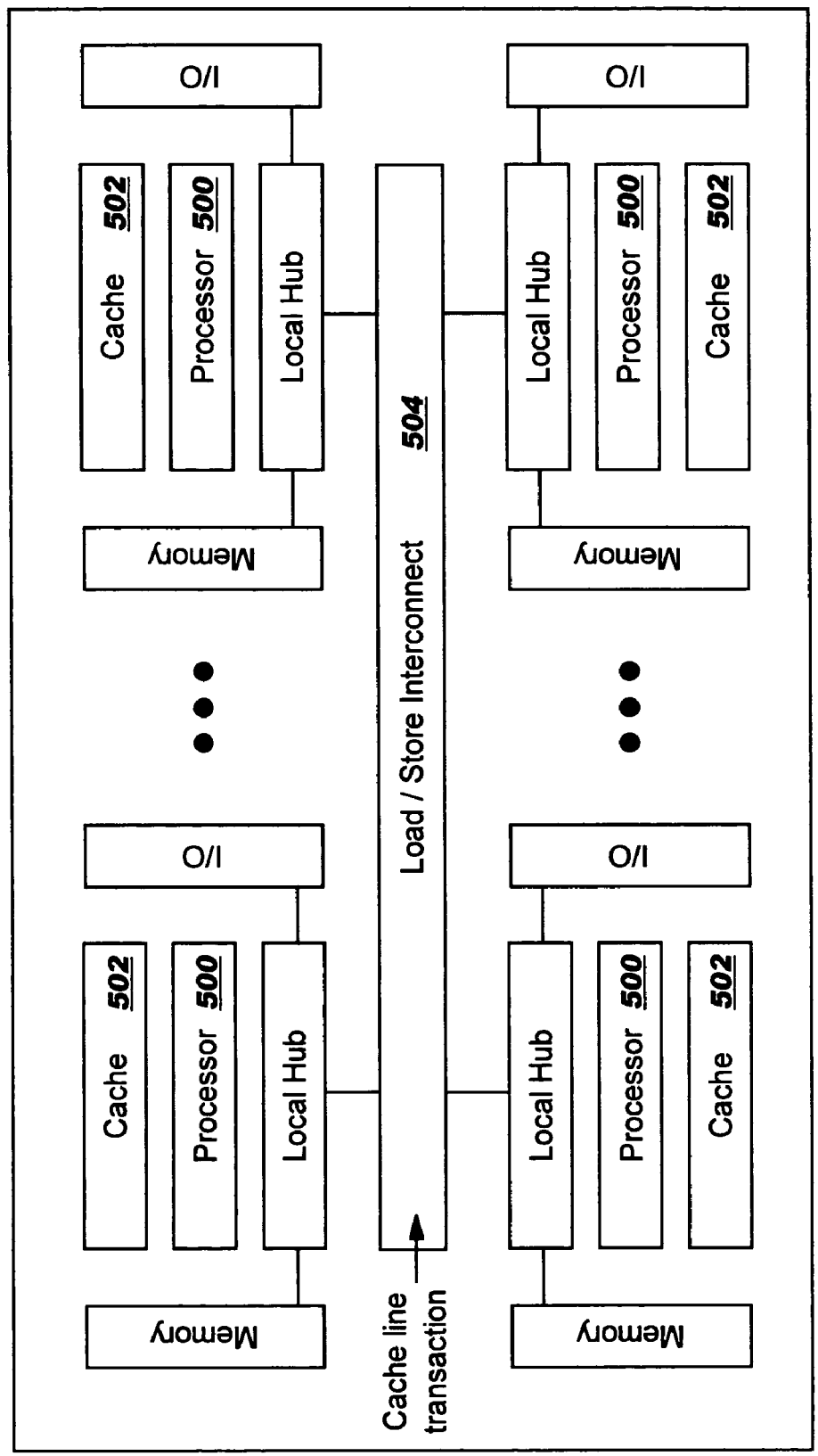
FIG. 7 is an alternative environment of FIG. 1.
Figure 8:
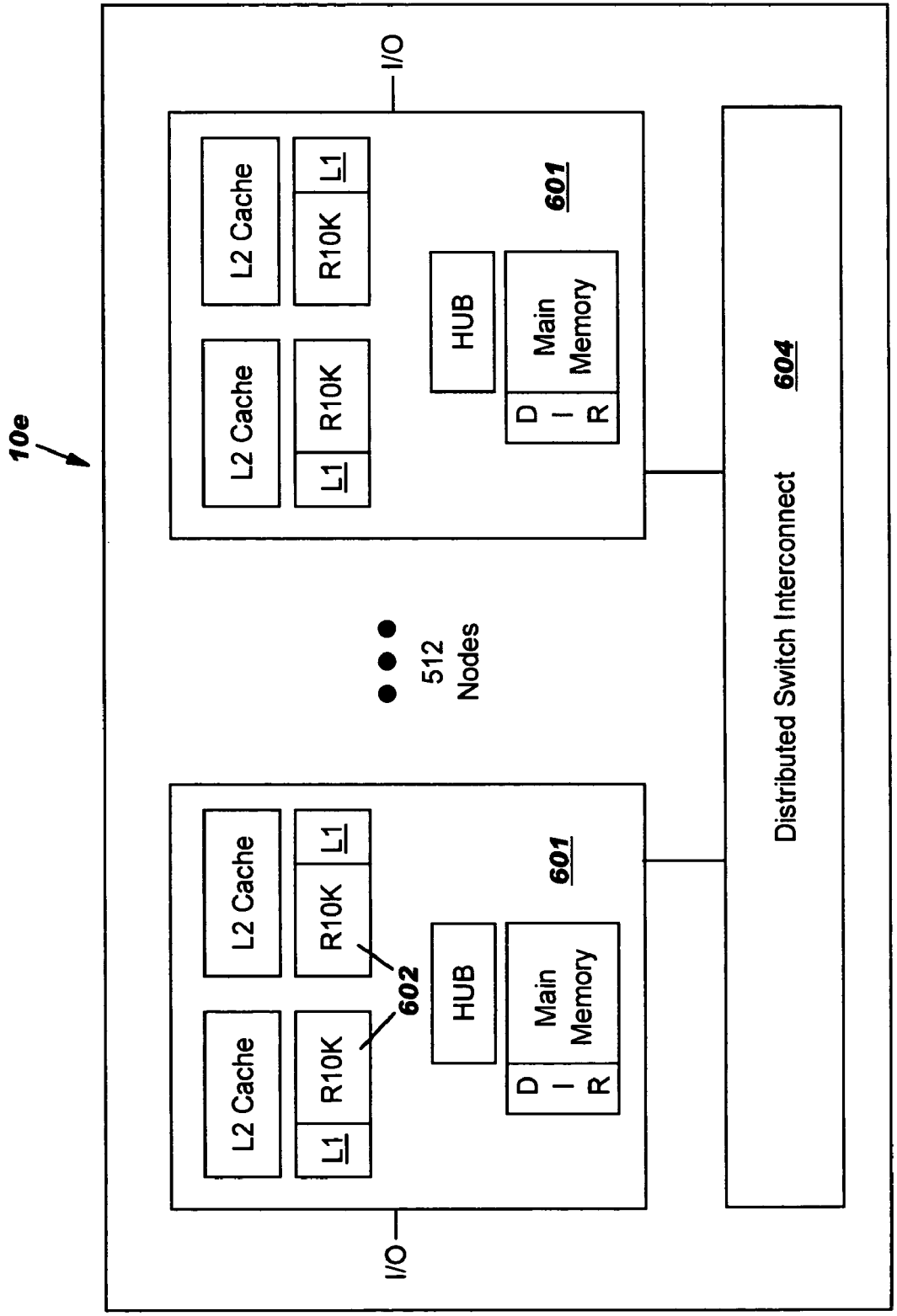
FIG. 8 is an alternative environment of FIG. 1.

FIGS. 6, 7, 8 show alternative embodiments of the shared multiprocessor system 10a, 10b. Referring to FIG. 6, an example MPP environment 10c is shown having multiple processors 400 with associated caches 402. Each processor 400 is interconnected by a message parsing interconnect 404. Alternatively, FIG. 7 shows an exemplary DSM environment 10d having multiple processors 500 with associated caches 502. Each processor 500 is interconnected by a load/store interconnect 504. Alternatively, FIG. 8 shows an exemplary cc-NUMA environment 10e having multiple nodes 600 having L1 and L2 caches with corresponding processors 602. Each of the nodes 601 is connected by a distributed switch interconnect 604. It is recognized that each of the environments 10a,b,c,d,e represent shared memory multiprocessor systems that can be interchangeable as exemplary platforms suitable for implementation of the control of cache-to-cache transfer misses for store operations described below.

Referring again to FIG. 1, also included on the chip 14 are functions we logically call pervasive functions. These include trace and debug facilities 22 used for first-failure data capture, built-in self-test (BIST) facilities 24, a performance-monitoring unit 26, an interface to the service processor (SP) 28 used to control the overall system, power-on reset (POR) sequencing logic 30, and error detection and logging circuitry 32. The system 10a also has a store management module 36 coupled to the processors 12 for implementing the store miss management method as further described with reference to FIGS. 9a, 9b, and 14 below. It is recognized that the functionality of the module 36 can be represented either in whole or in part by other components of the system 10a, as appropriate.

Cache Line Model

Example Cache Components

Figure 2:
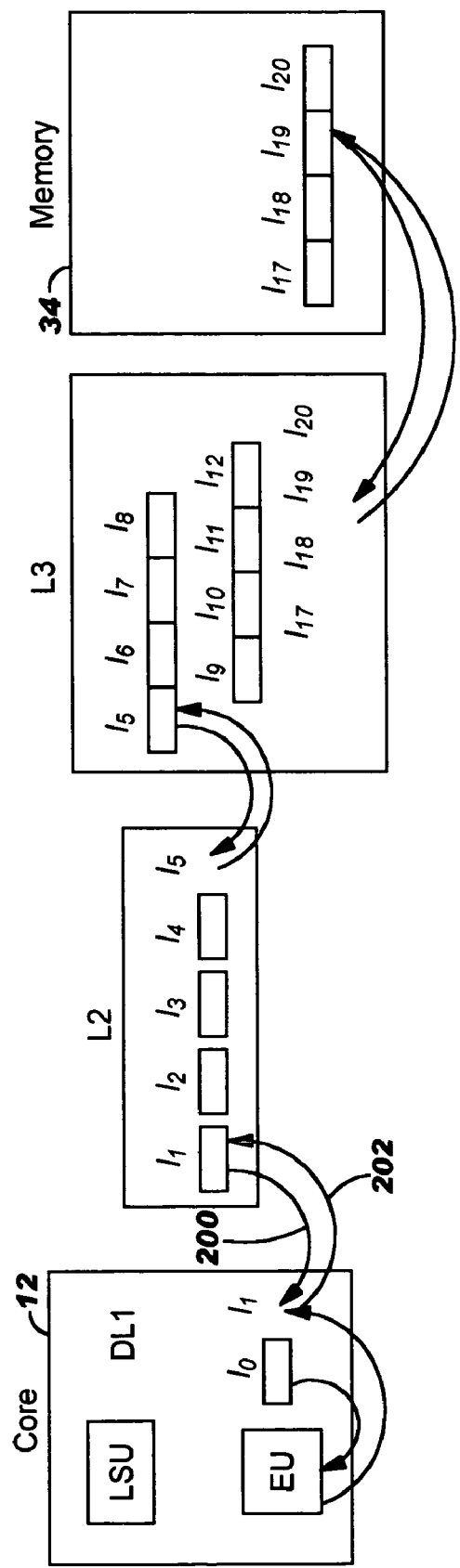
FIG. 2 shows a multiple cache arrangement of the environment of FIG. 1.

Referring to FIG. 2, the POWER4 chip 14 (see FIG. 1) employs hardware to prefetch data transparently to software into the L1 data cache. When load instructions miss sequential cache lines li (I=1,20 for POWER4), either ascending or descending, the prefetch engine (not shown) initiates load accesses to the following cache lines li before being referenced by load instructions. In order to ensure that the data will be in the L1 data cache, data (typically in the form of array elements A(i)) is prefetched by cache lines li into the L2 from the L3 and into the L3 from memory. FIG. 2 shows the sequence of prefetch load operations 200. Eight such streams per processor 12 are supported. It is recognized that as well store operations 202 are performed sequentially from the L1 cache downwards towards the main memory 34 for cache lines being used for memory stores, such as when arithmetic operations are completed by the processor 12 (thus providing updated values for array A(i) elements).

Example Cache Store Miss

The cache line li (otherwise called a cache block) is a relatively small representative unit of data of the system 10a that can be transferred between the main memory 34 and between the caches L1,L2, L3. This unit of memory can be a collection of bytes (see FIG. 3) to be read and cached at the same time by the system 10a. The caches L1,L2, L3 are specialized buffer storage devices that are continuously updated to optimize data transfer (e.g. array elements A(i)) between system 10a components. In situations where a cache line li is not successfully stored cache-to-cache, i.e. a data store miss, the request to store from memory (i.e. a store operation 202) cannot be satisfied by the cache and the main memory 34 can therefore be consulted to rectify. For example, in the case of an L1 to L2 cache data transfer (in the form of cache lines li), an updated array element A(i) in the L1 cache is intended to be stored to the corresponding old array element A(i) resident in the L2 cache. When the old element A(i) is not resident in the L2 cache, the store operation 202 for the updated A(i) element cannot be completed, i.e. a data store miss occurs, and the old array element A(i) must first be fetched by a load operation 200 from either the L3 cache or ultimately from memory 34. This preliminary loading operation 200 for the old A(i) into the L2 cache results in undesirable latencies before the intended store operation 202 of the updated A(i) element (from L1 to L2) can be completed.

Referring to other systems 10b,c,d,e, in FIG. 8 for example, the cc-NUMA system 10e can have the store miss when a requesting node 601 is the node containing the L2 cache that issues a miss for an intended cache line li transfer thereto. A second directory node 601 can be the node where the main memory is allocated of the required block for the cache line li (i.e. acting as the L3 cache of the system 10a). A third exclusive node 601 is the node that holds a valid copy of the old line li (i.e. acting as the memory 34 of the system 10a) that must be loaded 200 to allow completion of the intended store operation 202 to the L2 cache of the requesting node 601. This preliminary loading 200 from the exclusive node 601 to the requesting node 601 can be performed by the directory node 601.

Example Cache Operation

Referring again to FIGS. 2 and 3, cache-to-cache transfers for data sequential reference streams 300 (i.e. a sequence of memory access for an indexed array A(i)), once recognized by the system 10a, is done whenever the load instruction 200 initiates a request for data in a new cache line li. The prefetch engine begins staging the next sequential line li into the L1 data cache from the L2, for example. At roughly the same time, the engine initiates a request to the L3 to stage the line li into the L2. However, since latencies to load the L2 from the L3 are longer than the latency to load the L1 from the L2, rather than prefetch the second cache line li, the fifth is prefetched, as shown in FIG. 2. Prior references, or the initial ramp-up on stream initiation, have already staged the second through fourth lines li from the L2 to the L1 data cache. Similarly, the line li is replaced in the L3 from memory 34. To minimize processing required to retrieve data from memory 34 into the L3, a 512-byte line li is prefetched. This is done only every fourth line li referenced. In the case shown in FIG. 2, lines li=17 through 20 are prefetched from memory 34 to the L3. It is recognized that the processor 12 is also involved in implementing store operations 202 to transfer cache lines li downwards between caches L1 to L3 and memory 34. Further, it is recognized that the above description of the cache line model for the POWER4 chip 14 is done by way of example to illustrate cache operation of the shared memory system 10a. Further, it is recognized that preliminary load operations 200 are performed before the intended store operation 202 can be completed in the case of a store miss occurrence.

Because memory references are based on real addresses, the prefetching is stopped whenever a page boundary is crossed, since we do not know the real address of the next page. To reduce the performance impact, the POWER4 chip 14 implements two page sizes, 4 KB and 16 MB. In addition to allowing the prefetch to continue for longer streams 300, it can save translation time. This is especially useful for technical applications, where it is common to sequentially reference large amounts of data. For example, for the POWER4 chip 14, special logic to implement data prefetching exists in a processor load/store unit (LSU) and in the L2 and L3 caches. The direction to prefetch, up or down, is determined by the actual load address within the line li that causes the cache miss. If the load address is in the lower portion of the line li, the guessed direction is up. If the load address is in the upper portion of the line li, the guessed direction is down. The prefetch engine initiates a new prefetch when it detects a reference to the line li it guessed will be used. If the initial guess on the direction is not correct, the subsequent access will not confirm to the prefetch engine that it had a stream 300 (see FIG. 3). The incorrectly initiated stream 300 will eventually be deallocated, and the corrected stream 300 will be installed as a new stream 300.

Store Miss Control

Figure 3:
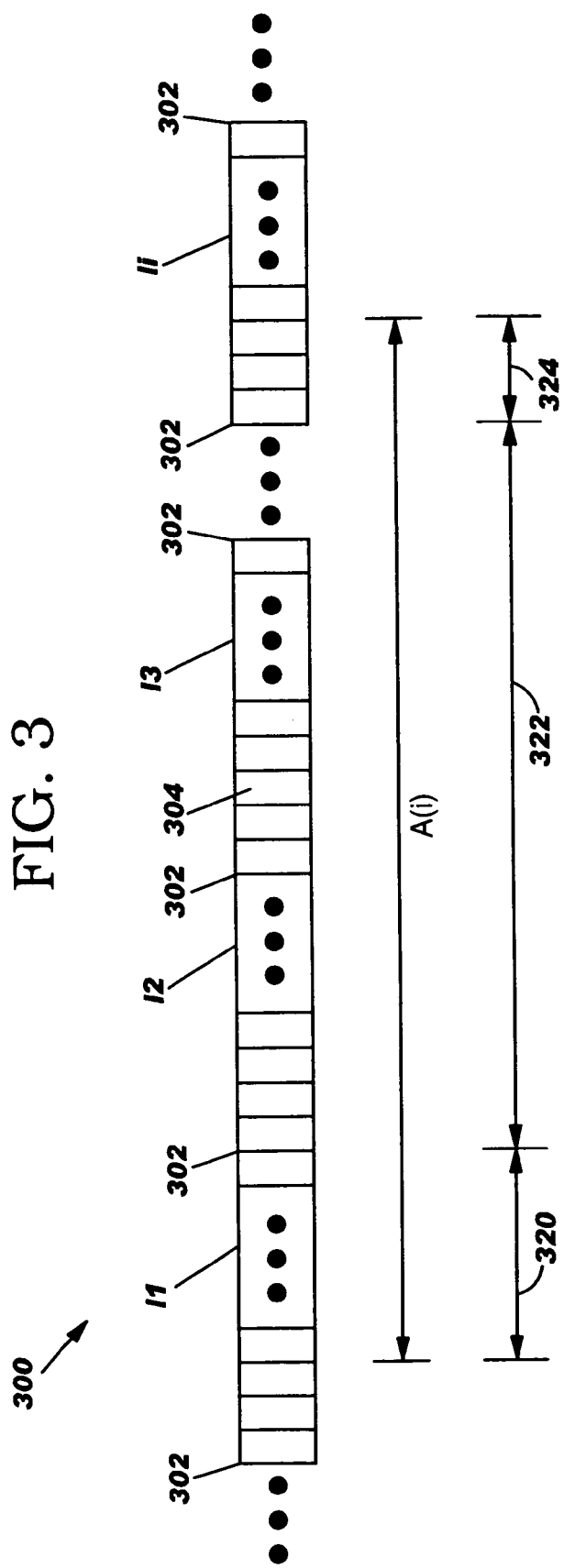
FIG. 3 is an exemplary store stream of the cache arrangement of FIG. 2.

Referring to FIGS. 2 and 3, the processor 12 supports automatic detection and prefetching of up to 8 concurrent load streams 300 (in the case of the POWER4). The prefetch engine detects sequentially increasing or decreasing accesses to adjacent cache lines li and then requests anticipated lines li from more distant levels of the cache L1,L2, L3 and memory 34 hierarchy. However, the prefetch engine does not support store streams. Furthermore, the L1 data cache on the Power 4 is write-through so that if a targeted line li is not already allocated in the L1, the line li will only be allocated in the L2 cache. If the line li is not allocated in the L2 cache, the store miss is generated to read the contents of that line li from memory 34 or other cached locations (such as the L3 cache). The system 10a offers a Data Cache Block Zero (DCBZ) instruction which will cause the specified line(s) li in the cache L2, L3 to be set to all zeroes, thus priming the zeroed cache line(s) li to accept the cache line li data store transfer from the corresponding cache L1,L2 respectively. An advantageous strategy for streams 300 of stores to strictly adjacent, sequentially increasing or decreasing memory locations is to use the DCBZ instruction to clear storage ahead of the store stream 300 (i.e. the sequence of array elements A(i) intended for storage). The DCBZ instruction implicitly informs the processor 12 that the store miss is unnecessary. Consequently, this strategy helps to inhibit store misses for all completely stored cache lines li. Avoidance of a store miss can improve the throughput of stores in the system 10a because the end-to-end latency of the store instruction 202 can be reduced. The avoidance of a store miss can also save bandwidth out of the L2 cache. This can be of particular benefit in memory bound multi-threaded applications where the limiting performance factor is bandwidth into and between the L2 caches on the system 10a. It is recognized that cache line models other than described above can be used by the systems 10a,b,c,d,e. However, these systems 10a,b,c,d,e are similarly susceptible to cache-to-cache store misses, such as but not limited to L1 to L2 and L2 to L3 store transfers. Implementation of the DCBZ instruction is further described below.

Store Stream

Further, referring to FIG. 3, static predication and run-time profile information are used to guide loop and stream 300 selection including re-alignment of the most profitable streams 300 by cache line boundaries 302. Due to the unique feature of DCBZ instruction, compile-time loop cost analysis and run-time check code and versioning are used to determine the best number of cache lines li ahead for data prefetch and tolerate proper data alignment relative to data cache line boundaries 302. With the integration of other loop optimizations for data locality, a performance improvement can be obtained thought this method based on the measurement on SPEC2000 and stream benchmarks. Further, it is recognized for example the store stream 300 can include a number of sequential cache lines li, each having 16 elements 304 for holding individual array elements A(i). This makes each cache line li capable of holding a 16×8 byte block of data. Typically the system 10a implements one stream 300 per array A(i); where the array is held across a plurality of cache lines li between adjacent streams 300. It is further recognized that the array A(i) may not start and stop exactly on the boundaries 302 of the stream 300.

Example L2 Cache Design

The following is an example configuration of the L2 cache for illustrative purposes. It is recognized that similar or other configurations could be used to provide access and operative functionality to the L3 cache as well, if desired.

Figure 4:
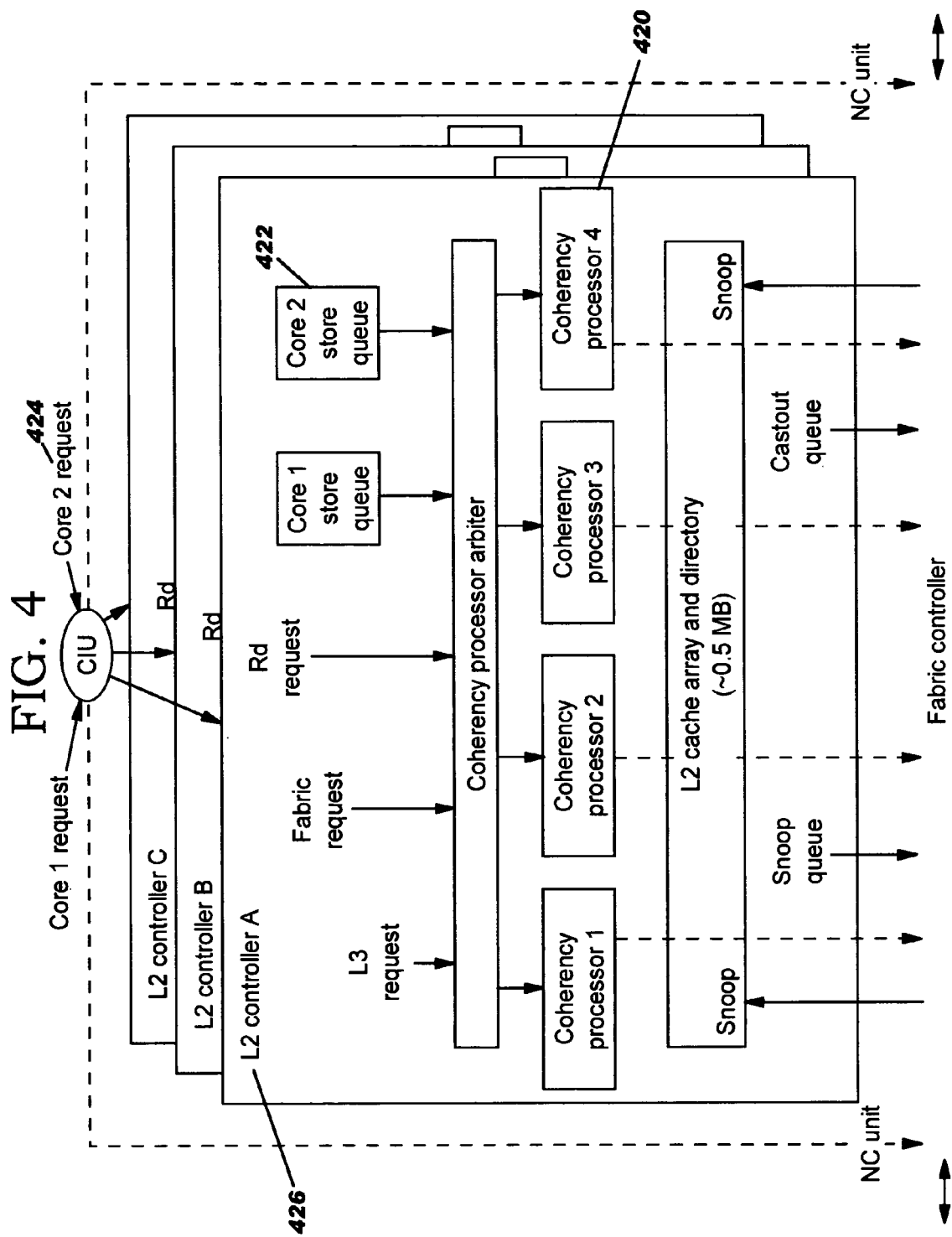
FIG. 4 shows a L2 cache architecture of the environment of FIG. 1.

Referring to FIG. 4, the unified second-level L2 cache is shared across the two processors 12 on the POWER4 chip 14. FIG. 4 shows a logical view of the L2 cache. The L2 is implemented as three identical slices, each with its own controller 426. Cache lines li are hashed across the three controllers 426. Each controller 426 contains four SRAM partitions, each capable of supplying 16 bytes of data every other cycle. The four partitions can supply 32 bytes per cycle, taking four consecutive cycles to transfer a 128-byte line li to the processor 12. The data arrays are ECC-protected (single-error correct, double-error detect). Both wordline and bitline redundancy are implemented. Since the L1 cache is a store-through design, store requests to the L2 cache are at most eight bytes per request. The L2 cache implements two four-entry 64-byte queues for gathering individual stores and minimizing L2 cache requests for stores.

The majority of control for L2 cache management is handled by four coherency processors 420 in each controller 426, in conjunction with the module 37 (see FIG. 1). A separate coherency processor 420 is assigned to handle each request to the L2 cache. Requests 424 can come from either of the two processors 12 (for either an L1 data-cache reload or an instruction fetch) or from one of store queues 422. Each coherency processor 420 has associated with it a cast-out processor to handle deallocation of cache lines to accommodate L2 reloads on L2 misses (when the DCBZ instruction was not used or the miss was not avoided by its use). The coherency processor 420 can do the following:

Control the return of data from the L2 (hit) or from the fabric controller (miss) to the requesting processor via the CIU 13 (when the DCBZ instruction was not used or the miss was not avoided by its use);

Update the L2 directory as needed;

Issue fabric commands for L2 misses on fetch requests and for stores (when the DCBZ instruction was not used or the miss was not avoided by its use);

Control writing into the L2 when reloading because of fetch misses in the L2 or when accepting stores from the processors 12 (when the DCBZ instruction was not used or the miss was not avoided by its use); and Initiate back-invalidates to the processor 12 via the CIU resulting from a store from one processor that hits a cache line li marked as resident in the other processor's L1 data cache.

Included in each L2 controller 426 are four snoop processors responsible for managing coherency operations snooped from the fabric. When a fabric operation hits on a valid L2 directory entry, a snoop processor is assigned to take the appropriate action. Depending on the type of operation, the inclusivity bits in the L2 directory, and the coherency state of the cache line, one or more of the following actions may result:

Sending a back-invalidate request to the processor(s) to invalidate a cache line in its L1 data cache.

Reading the data from the L2 cache.

Updating the directory state of the cache line.

Issuing a push operation to the fabric to write modified data back to memory.

Sourcing data to another L2 from this L2.

In addition to dispatching a snoop processor, the L2 provides a snoop response to the fabric for all snooped operations. When a fabric operation is snooped by the L2, the directory is accessed to determine whether the targeted cache line is resident in the L2 cache and, if so, its coherency state. Coincident with the snoop directory lookup, the snooped address is compared with the addresses of any currently active coherency, cast-out, and snoop processors to detect address-collision scenarios. The address is also compared to the per-processor reservation address registers. On the basis of this information, the snoop response logic determines the appropriate snoop response to send back.

It is recognized that configurations of the L2 cache other than described above can be implemented on the system 10*a*, as desired.

Store Miss Management Module

Figure 14:
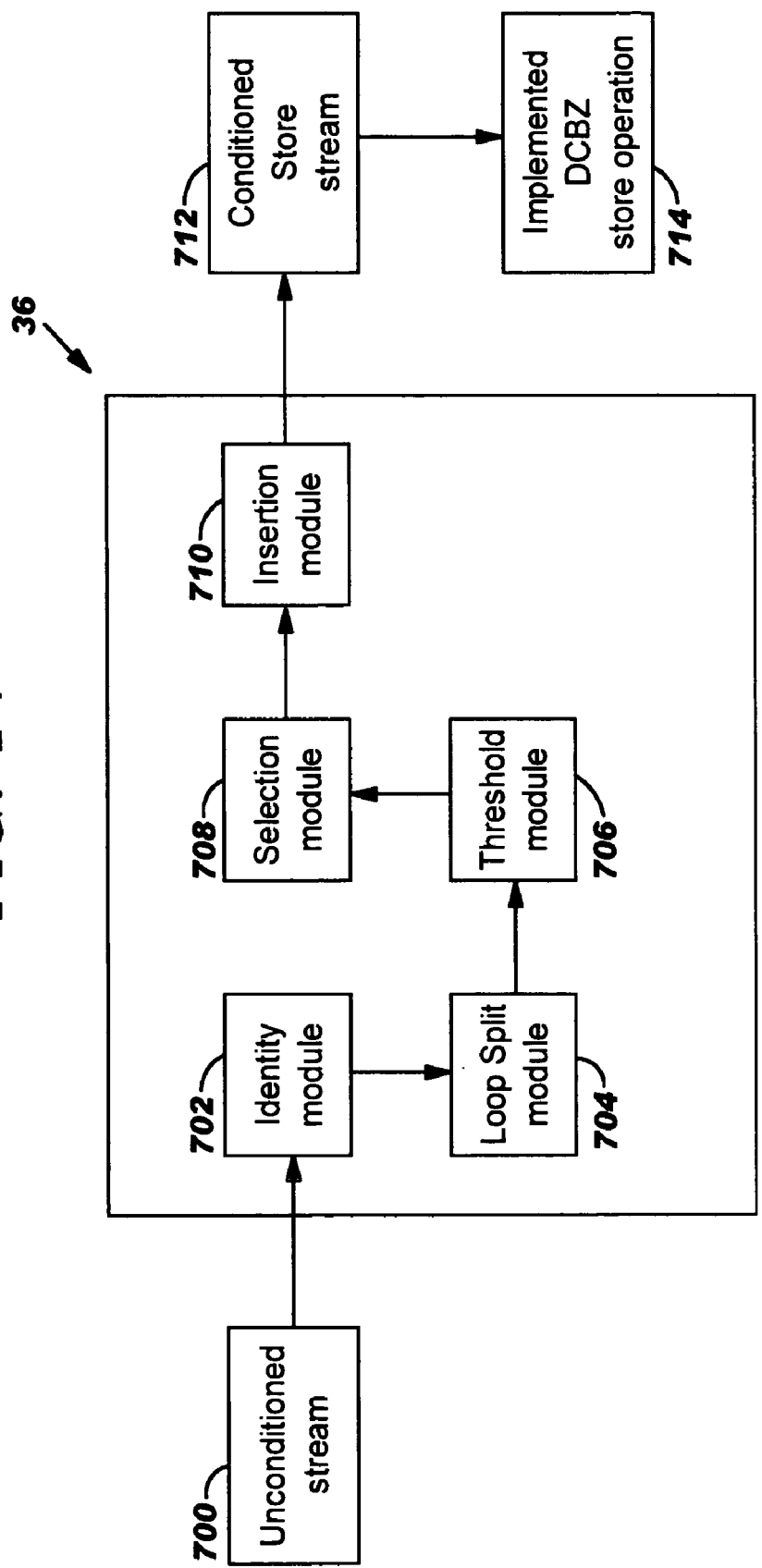
FIG. 14 shows a store miss management module for the method of FIGS. 9a and 9b.

Referring to FIG. 14, the store management module 36 is used to combine software-controlled store miss inhibition/avoidance with underlying hardware load stream prefetch support of the system 10*a* to obtain a reduction in store miss occurrence. The module 36 can include:

(1) an identity module 702 using data dependency and reuse analysis to identify and classify unique streams 300 in the loops of application code;

(2) a loop split module 704, for basing on the sophisticated reuse and dependence analysis, a loop distribution function for splitting a loop with many streams 300 into several loops with the proper number of streams without compromising cache locality and reuse. The module 704 can also perform loop stream 300 unrolling that unrolls a loop with few store streams 300 into a loop with multiple store streams 300 to balance the hardware multiple L2 cache store controllers;

(3) a threshold module 706 for performing a compile-time loop cost analysis to determine how many cache lines li ahead to zero one cache line li of the store streams 300 by the DCBZ instruction, preferably without reading the memory;

(4) a selection module 708 for selecting store streams and aligning the corresponding loop iterations with cache line boundaries 302 where appropriate. Static data flow analysis and runtime profile information is used for stream and loop selection with the constraint of the code size; and (5) an insertion module 710 for inserting the zero cache line li instruction when conditioning the selected store streams 300. The compile-time data alignment analysis and runtime alignment checks are done so that the DCBZ instruction is inserted at a right point in the corresponding loop for store miss inhibition/avoidance.

The module 36 takes unconditioned store streams 700 and processes them to result in conditioned store streams 712 to provide for implemented DCBZ store operation 714 in the affected loops of the application code for store stream operation of cache-to-cache data store, e.g. L1 to L2 cache transfer. It should be noted that implementation of the DCBZ instruction causes the prefetch hardware/software of the system 10*a* to ignore the imposed store condition, i.e. that if the resident corresponding array element must be present in the intended store cache line li of the store cache. It is further recognized that the components of the module 36 could be implemented as a combination of hardware and software and could also be implemented on a computer readable medium, such as but not limited to hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid state memory card, or RAM provided in the memory. It should be noted that the above listed example computer readable mediums can be used either alone or in combination.

Operation of the Store Miss Management Module

Referring to FIG. 3, the stream 300 is called a stride 1 stream if the sequence of memory addresses which depend on an inner loop induction variable has a constant stride less than the L1 D-cache line size. The stream 300 is a load stream if it includes at least one load operation, otherwise it is a store steam. For example, the arithmetic operation C(i)=A(i)+B(i) for the processor 12 would represent two load streams A(i), B(i) and one store stream C(i) once the arithmetic operation was completed. The stream 300 is called a strided stream if its stride is either unknown or a constant larger than L1-cache line li size.

Stream Identification and Classification

Figure 9A:
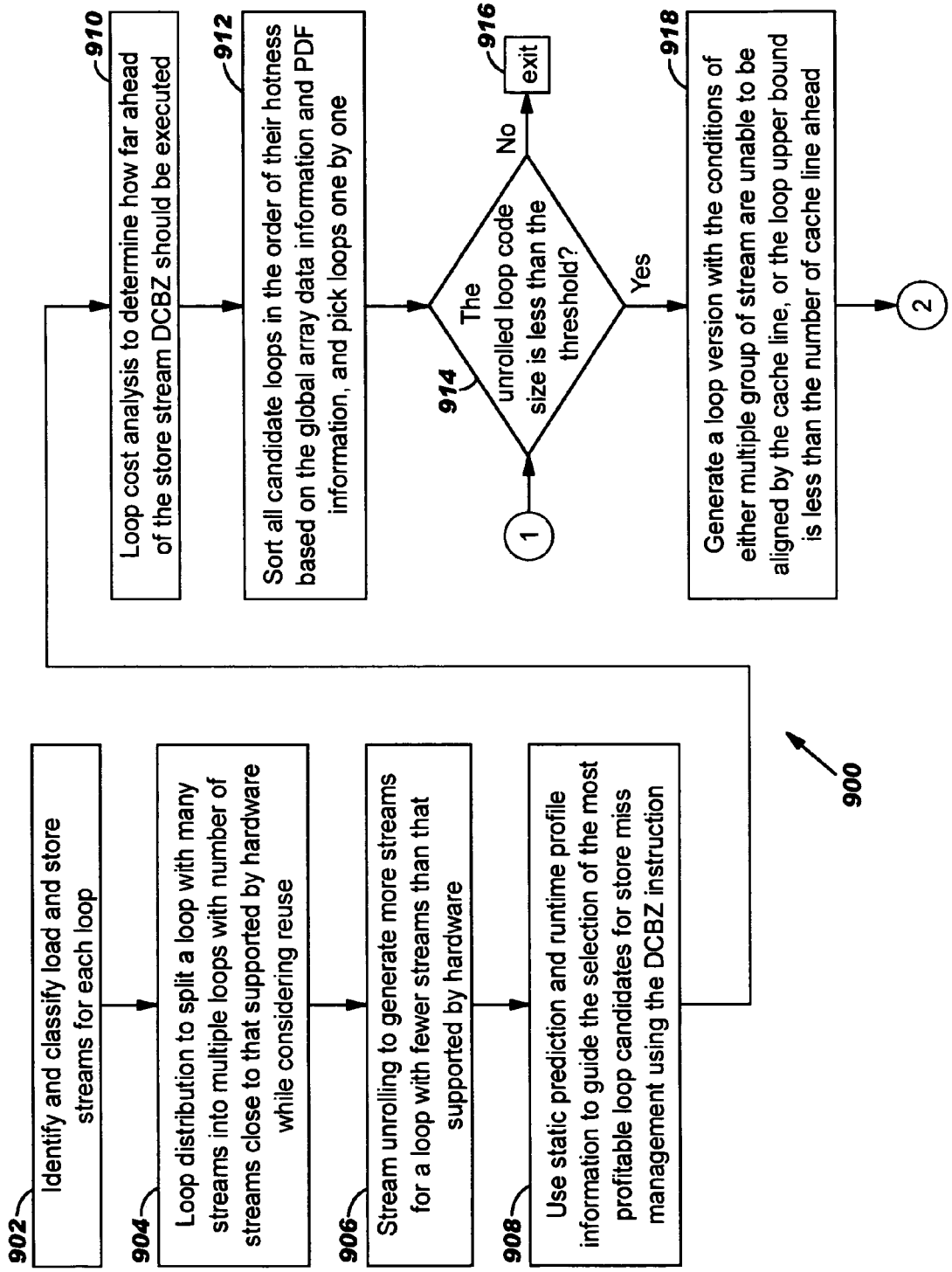
FIG. 9a shows an exemplary operation of a store miss management method for the environment of FIG. 1.

Referring to FIG. 9a, operation 900 of the module 36 begins at step 902 for processing by the processor 12 an input as an innermost loop and outputs a stream list with each stream 300 marked as either a load stream or a store stream. For example, step 902 can include substeps such as:

Step 1 Build control flow and data flow graph;

Step 2 For each innermost loop, get the list of references in the loop;

Step 3 For each array reference,
build a subscript for the array A(i) reference and mark it as the load stream 300 if there are any uses in a loop or store stream 300 otherwise,
go through the current stream list to check if the stream 300 associated with the array A(i) reference is already in the stream list by comparing the multipliers and addends for all dimensions and checking if the address difference in the differing dimension is a constant less than the given page size, and,
add the stream 300 to the stream list if the stream 300 is unique.

After all the streams 300 in the innermost loop are gathered and classified, we further examine the store streams 300 and group them if their relative locations are known at compile-time. Two store streams 300 are said to be in the same group if one of the store streams 300 in the given loop is aligned with the cache line boundary 302 (see FIG. 3), such that the other store stream 300 is also aligned with possible padding if necessary, further described below in reference to a prologue portion 320 of the stream 300 (see FIG. 3). The store stream 300 is said to be a leading reference if it is aligned with the cache line boundary 302, making all others of the group also aligned by the cache line boundary 302. The stream grouping can also perform constant strided stream 300 merging for the case that the loop goes through an array A(i) of structure to initialize all structure elements. The data layout transformations such as FORTRAN common block splitting can expose the opportunities of compile-time alignment setting and padding for stream grouping, as further described below. Further, step 902 can also investigate data dependency and reuse analysis for the arrays A(i),B(i),C(i), etc. . . . contained in each of the loops.

Loop Transformations for a Proper Number of Streams 300

Figure 10:
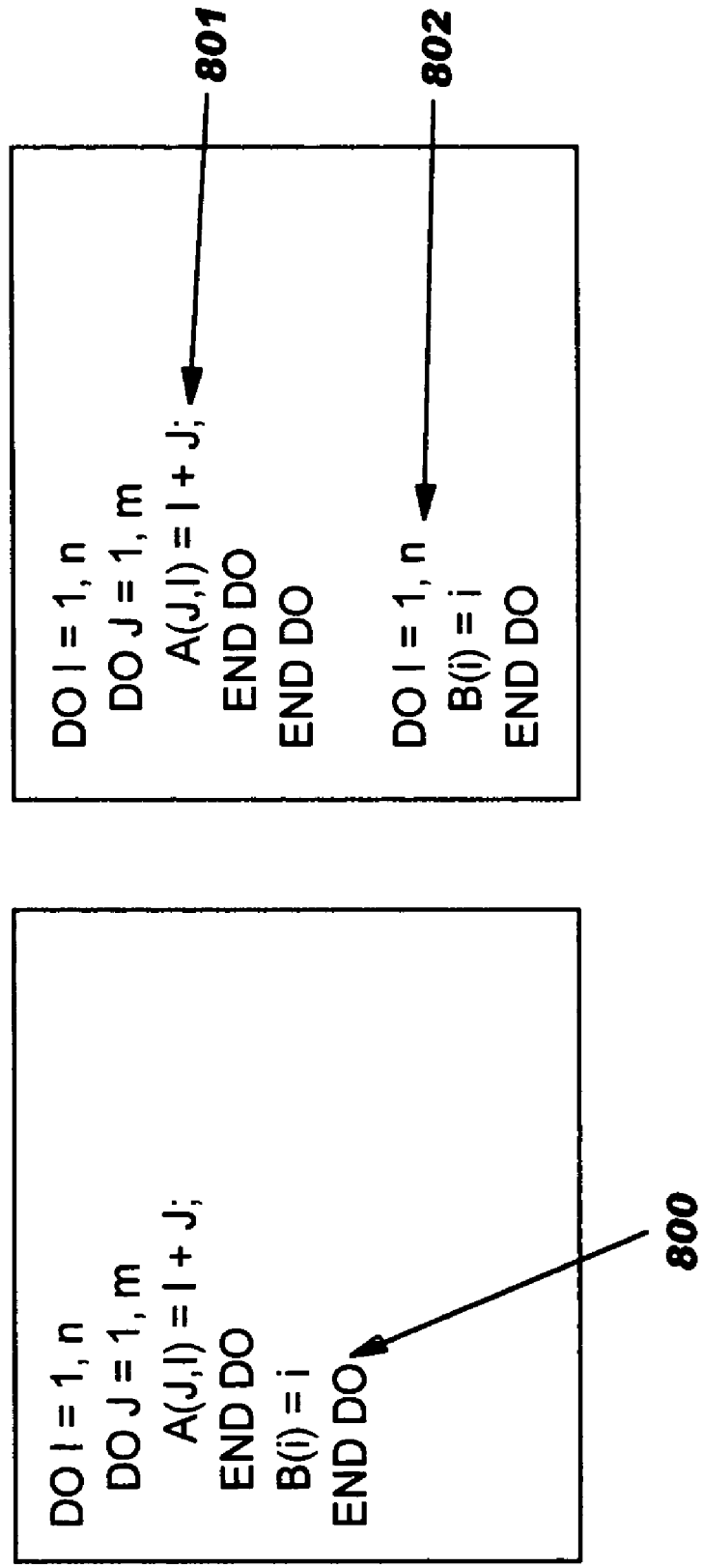
FIG. 10 is an exemplary application of the method of FIGS. 9a and 9b.

In step 904, loop distribution can transform loops to try to make all calculations in a nested loop occur in the innermost loop to create perfect nests in order to expose more loop optimization opportunities such as outer loop unrolling and loop interchange. Additionally, loop distribution can distribute loops with many streams into several simple loops with a proper number of streams 300, particularly based on stream grouping information and data dependency and reuse analysis. For example, referring to FIG. 10, a loop 800 for the arrays A(I,J) and B(i) is split into two different loops 801 and 802.

Figure 12:
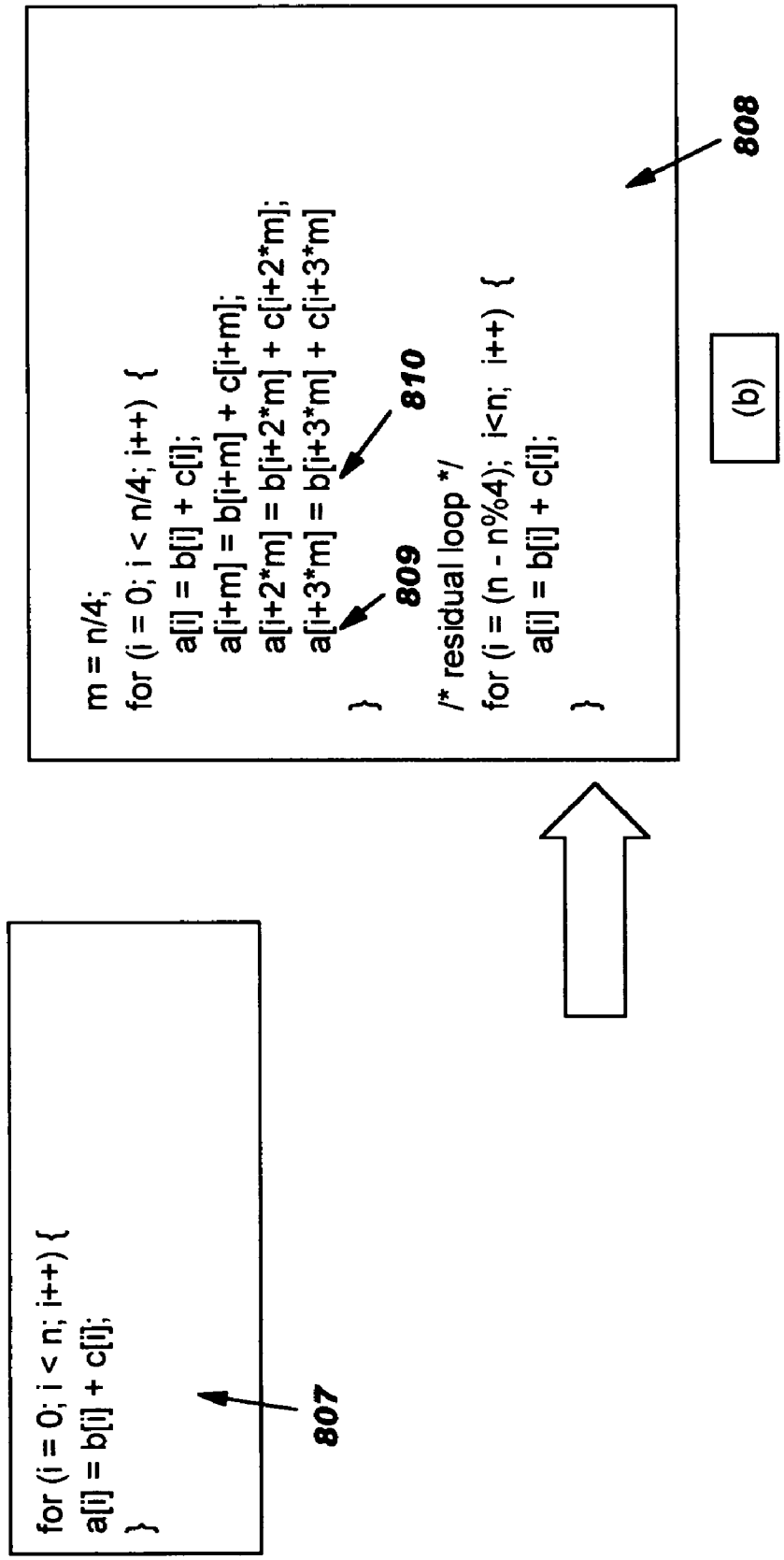
FIG. 12 is an exemplary application of the method of FIGS. 9a and 9b.

Further, step 904 can also perform node splitting optimization that can split the loop statement by introducing temporal vectors so that loop distribution can be performed to split the streams 300. For example, referring to FIG. 11, a loop 804 for the array A3(i,j,k) is split into two loops 805,806. Further, step 906 is such that when the loop has fewer streams 300, stream unrolling can be used to generate more streams 300 based on the dependence analysis. For example, a loop 807 in FIG. 12 has one store stream a(i) and 2 load streams b(i) and c(i). Since the loop 807 has no carried dependence, the loop 807 can be transformed into the loop 808 with 4 store streams 809 and 8 load streams 810.

Loop and Stream Selection With Static and Run-Time Profile Guidance and Code Size Control In step 908, global array data flow analysis, and static and dynamic profile information can be used to select the most profitable loops with the consideration for using the DCBZ instruction, such as but not limited to: loop iteration count base on static and run-time profile information, I cache (code size), how many streams 300 are properly aligned, how many stream 300 groups in the loop, whether the streams 300 in the loop are more likely to suffer cache miss based on the global array data analysis and reuse analysis.

Loop Cost Model and Analysis for the Number of the Cache Line Ahead

Step 910 analyses a loop cost to determine how far ahead of the store stream 300 the DCBZ instruction should be implemented to zero the corresponding cache lines li in the forward cache (e.g. zero cache lines li in the L2 cache for use to store L1 cache content). It is recognized that the DCBZ instruction essentially resets the cache lines li such that the affected cache lines li are not required to have an old copy of the updated array element to successfully implement the store operation 202 (see FIG. 2). The loop body cost LoopCost can be calculated by example as follows:

$$LoopCost = \left\{ \max\left(CP, \frac{FloatPointCycles}{NFPU}, \frac{FixPointCycles}{NFXU}, \frac{LoadStoreCycles}{NLSU}\right), + MemoryCost \right\}$$

where
NFPU: number of floating-point units;
NFXU: number of fixed-point units;
NLSU: number of load/store units;
 CP: estimated total number of cycles in the critical path;
 FloatPointCycles: estimated total number of cycles spent on floating-point operations;
 FixPointCycles: estimated total number of cycles spent on fixed-point;

LoadStoreCycles: estimated total number of cycles spent on address generation for load/store operations;

MemoryCost: estimated cost for reading and writing memory;

Based on the above example calculation, the number of cache line(s) li to zero ahead (i.e. a lower threshold of stream 300 size for use of the DCBZ instruction) is $$\left\lceil \frac{Latency_{L2}}{LoopCost} \right\rceil,$$

where $Latency_{L2}$ is L2 cache miss latency. It is recognized that calculations could be done for other caches based on corresponding cache characteristics.

Loop Versioning and Loop Peeling for Data Alignment

Step 912 sorts all candidate loops in order of their criticality to potential store misses based on the global array data information performed in step 908, and then selects loops for inserting the DCBZ store miss control instruction. Step 914 determines if the stream 300 size (number of cache lines li) in each of the selected store streams 300 in the loops is less than the loop cost threshold (i.e. have the minimum number of cache lines li to perform DCBZ on). For example, threshold=1,2,3, or more cache lines li ahead of the store stream 300. If no, then the method 900 goes 916 to the next selected candidate loop. If yes, a version of the selected candidate loop is generated 918 such that the resident elements 304 of the store streams 300 in the loop are aligned with cache line boundaries 302, as further described below. For example, referring to FIG. 13, the selected loop 600 is processed as loop 602 if no DCBZ instructions are appropriate based on the threshold or the inability of the module 36 (see FIG. 1) to align the corresponding stream 300 with the cache line boundaries 302 (see FIG. 3).

Figure 13:
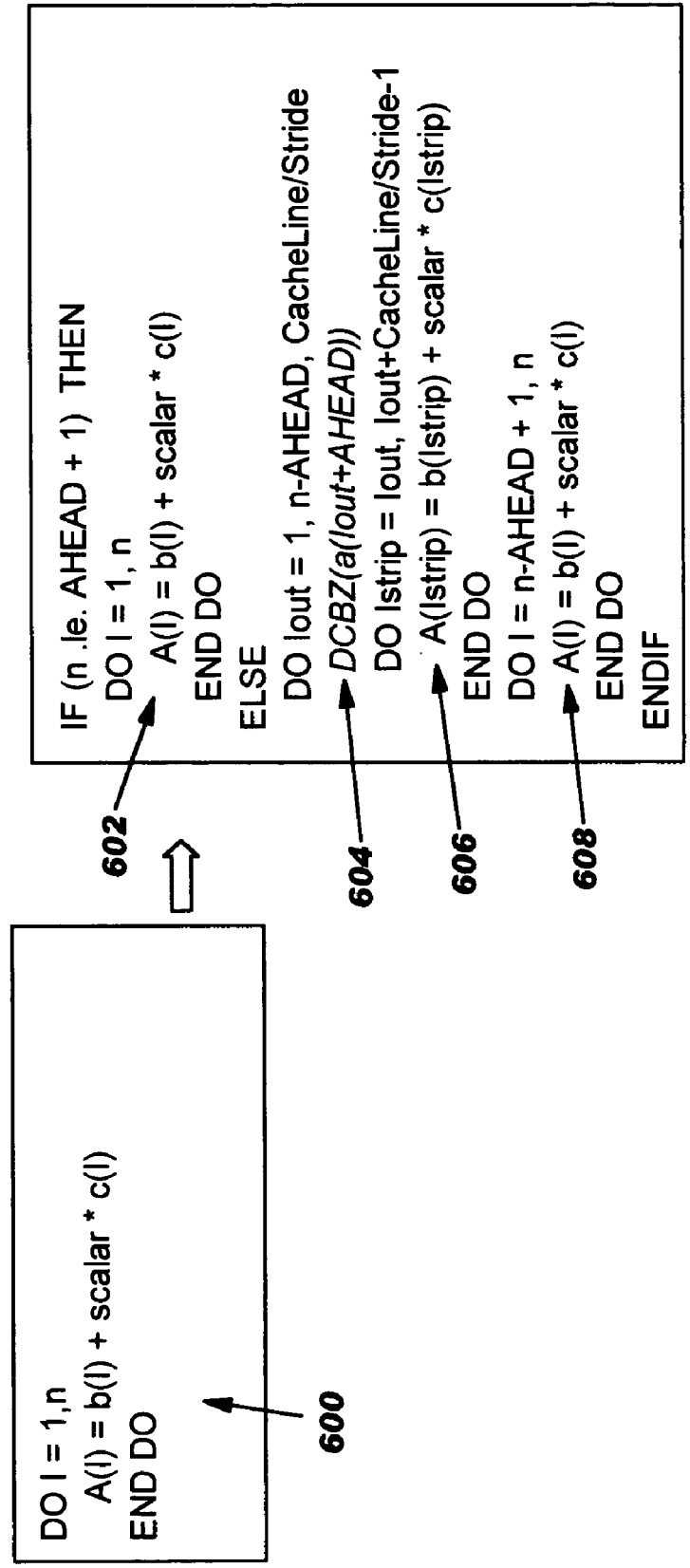
FIG. 13 is an exemplary application of the method of FIGS. 9a and 9b.

Referring to FIG. 9b, in steps 920 and 922, when the store stream 300 is not statically aligned by the cache line boundaries 302 and the number of the cache lines li to zero ahead is at least one, a prologue loop can be generated where appropriate for loop peeling that can be used to peel off one or more loop iterations so that the leading elements 304 of the store stream 300 is properly aligned with the cache line boundary 302 (see FIG. 3). It is recognized that the DCBZ instruction is not implemented for the elements 304 of the prologue portion of 320 of the stream 300 (see FIG. 3) corresponding to the prologue loop. It should be noted that no prologue loop is shown in the loop of FIG. 13. Since store streams 300 are grouped, all their streams 300 in the group are aligned if the leading steam 300 of the group gets aligned. The prologue loop can be removed if either all store streams are aligned by the cache line boundaries 302 or the number of the cache lines li to zero ahead is greater than 1, for example. Loop versioning is used to generate the loop under the condition of either the loop upper bound is not greater than the number of the cache lines li ahead (threshold) or the upper bounds (leading stream address % CacheLineSize) of the prologue portions 320 calculated for each group in the loop are not same (typically a rare case due to general loop distribution).

Strip Mining for DCBZ Insertion

In step 924, the DCBZ instruction is inserted and implemented for the DCBZ appropriate portion 322 (see FIG. 3) of the store stream 300. Each DCBZ instruction zeros one cache line li containing the required address in the cache (such as the L2) to be used for storage. The DCBZ instruction is issued so that any element 304 of the cache line li in the storage cache (e.g. L2) is zeroed before any value is stored into it and the cache line li to be accessed in the cache for storage (e.g. L2) can be zeroed once and only once for the correctness. After the prologue loop of steps 920,922, we strip mine the loop so that the innermost loop has the exact iterations to store one cache line li. Referring to FIG. 13, the loop 604 represents the sequential application of the DCBZ instruction for the appropriate cache line li of the store cache (e.g. L2) and the subsequent store 606 of the array element in the now zeroed cache line li. It is in this manner that the selected loop becomes conditioned to contain any prologue loop, the inserted DCBZ instruction, and an epilogue loop as further described below.

Referring again to FIG. 9b, step 926 generates the epilogue loop for the last few iterations remaining for the elements 304 after the boundary 302, i.e. the epilogue portion 324 of the stream 300 (see FIG. 3). Referring to FIG. 13, the loop 608 represents the epilogue loop once the DCBZ loop 604 and the subsequent store loop 606 are completed.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent is limited only by the following claims.

We claim:

1. A method for cache management in a shared memory multiprocessor environment to inhibit the occurrence of store misses during transfer of a store stream from a first cache to a second cache, the store stream including a plurality of cache lines having updated store elements, the method comprising the steps of:

identifying a store stream for potential miss conditioning in a loop of an application code;

performing a cost analysis for calculating a threshold value for further consideration of the identified store stream for miss conditioning;

selecting the identified store stream for miss conditioning based on an accepted value for the threshold value; and conditioning the selected store stream for miss inhibition by inserting a reset instruction in a corresponding loop of the selected store stream, the reset instruction for clearing at least one cache line in the second cache in advance of a store operation of the selected store stream;

wherein the reset instruction causes the environment to override an imposed store condition of a prefetch operation such that a previous version of the updated store elements is resident in the second cache in order to complete the store operation.

2. The method of claim 1, wherein the cost analysis step further comprises determining the number of cache lines ahead of the store stream for application of the reset instruction in the cache lines of the second cache.

3. The method of claim 2 further comprising the step of splitting the loop with many of the store streams into several loops with a corresponding smaller number of the store streams.

4. The method of claim 2 further comprising the step of unrolling the loop with a limited number of the store streams into a loop with an increased number of the store streams.

5. The method of claim 2 further comprising the step of assigning a lead element of a reset portion of the store stream with a cache line boundary of the stream, the reset portion for insertion of the reset instruction in a corresponding portion of the loop.

6. The method of claim 5 further comprising the step of generating a prologue portion of the store stream in the loop, the prologue portion not including the reset instruction.

7. The method of claim 5 further comprising the step of generating an epilogue portion of the store stream in the loop, the epilogue portion not including the reset instruction.

8. The method of claim 2, wherein the environment is selected from the group comprising; SMP, MMP, DSM, and a directory based cc-NUMA.

9. The method of claim 8, wherein the SMP environment is implemented on a POWER4 chip.

10. The method of claim 2, wherein the first cache is an L1 cache and the second cache is an L2 cache.

11. The method of claim 2, wherein the reset instruction is a data cache block zero instruction for zeroing elements of the selected cache line of the second cache.

12. The method of claim 5, wherein the reset instruction is a data cache block zero instruction for zeroing elements of the selected cache line of the second cache.

13. A system for cache management in a shared memory multiprocessor environment to inhibit the occurrence of store misses during transfer of a store stream from a first cache to a second cache, the store stream including a plurality of cache lines having updated store elements, the system comprising:
  an identification module for identifying the store stream for potential miss conditioning in a loop of an application code;
  a threshold module for performing a cost analysis for calculating a threshold value for further consideration of the identified store stream for miss conditioning;
  a selection module for selecting the store stream for miss conditioning based on an accepted value for the threshold value; and
  an insertion module for conditioning the selected store stream for miss inhibition by inserting a reset instruction in a corresponding loop of the selected store stream, the reset instruction for clearing at least one cache line in the second cache in advance of a store operation of the selected store stream;
  wherein the reset instruction causes the environment to override an imposed store condition of a prefetch operation such that a previous version of the updated store elements is resident in the second cache in order to complete the store operation.

14. The system of claim 13, wherein the cost analysis step further comprises determining the number of cache lines ahead of the store stream for application of the reset instruction in the cache lines of the second cache.

15. The system of claim 14 further comprising a loop module for splitting the loop with many of the store streams into several loops with a corresponding smaller number of the store streams.

16. The system of claim 14 further comprising a loop module for unrolling the loop with a limited number of the store streams into loop with an increased number of the store streams.

17. The system of claim 14 further comprising a loop module for assigning a lead element of a reset portion of the store stream with a cache line boundary of the stream, the reset portion for insertion of the reset instruction in a corresponding portion of the loop.

18. The system of claim 17 further comprising the loop module generating a prologue portion of the store stream in the loop, the prologue portion not including the reset instruction.

19. The system of claim 17 further comprising the loop module generating an epilogue portion of the store stream in the loop, the epilogue portion not including the reset instruction.

20. The system of claim 14, wherein the environment is selected from the group comprising; SMP, MMP, DSM, and a directory based cc-NUMA.

21. The system of claim 20, wherein the SMP environment is implemented on a POWER4 chip.

22. The system of claim 14, wherein the first cache is an L1 cache and the second cache is an L2 cache.

23. The system of claim 14, wherein the reset instruction is a data cache block zero instruction for zeroing elements of the selected cache line of the second cache.

24. The system of claim 17, wherein the reset instruction is a data cache block zero instruction for zeroing elements of the selected cache line of the second cache.

25. A computer program product for cache management in a shared memory multiprocessor environment to inhibit the occurrence of store misses during transfer of a store stream from a first cache to a second cache, the store stream including a plurality of cache lines having updated store elements, the computer program product comprising:
  a computer readable medium;
  an identification module stored on the medium for identifying the store stream for potential miss conditioning in a loop of an application code;
  a threshold module stored on the medium for performing a cost analysis for calculating a threshold value for further consideration of the identified store stream for miss conditioning;
  a selection module coupled to the threshold module for selecting the store stream for miss conditioning based on an accepted value for the threshold value; and
  an insertion module coupled to the selection module for conditioning the selected store stream for miss inhibition by inserting a reset instruction in a corresponding loop of the selected store stream, the reset instruction for clearing at least one cache line in the second cache in advance of a store operation of the selected store stream;
  wherein the reset instruction causes the environment to override an imposed store condition of a prefetch operation such that a previous version of the updated store elements is resident in the second cache in order to complete the store operation.

* * * * *